(12) United States Patent
Elad et al.

(10) Patent No.: US 8,791,851 B2
(45) Date of Patent: Jul. 29, 2014

(54) HYBRID MILLIMETER WAVE IMAGING SYSTEM

(75) Inventors: Danny Elad, Liman (IL); Evgeny Shumaker, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 13/151,282

(22) Filed: Jun. 2, 2011

(65) Prior Publication Data

US 2012/0306681 A1     Dec. 6, 2012

(51) Int. Cl.
*G01S 13/00* (2006.01)

(52) U.S. Cl.
USPC ............ 342/22; 342/27; 342/59; 342/73

(58) Field of Classification Search
USPC .................................... 342/22, 179
See application file for complete search history.

(56) References Cited

U.S. PATENT DOCUMENTS

| | | | |
|---|---|---|---|
| 5,325,129 A | 6/1994 | Henry et al. | |
| 5,528,354 A | 6/1996 | Uwira | |
| 6,272,349 B1 * | 8/2001 | McGrath et al. | 455/456.3 |
| 6,777,684 B1 | 8/2004 | Volkov et al. | |
| 6,791,487 B1 | 9/2004 | Singh et al. | |
| 6,828,556 B2 * | 12/2004 | Pobanz et al. | 250/336.1 |
| 7,642,949 B2 | 1/2010 | Pergande et al. | |
| 7,795,859 B1 * | 9/2010 | Lynch et al. | 324/120 |
| 8,305,259 B2 * | 11/2012 | Margomenos | 342/129 |
| 2004/0140924 A1 * | 7/2004 | Keller et al. | 342/22 |
| 2004/0149907 A1 | 8/2004 | Vaidya | |
| 2004/0174289 A1 * | 9/2004 | Singh et al. | 342/22 |
| 2005/0052324 A1 * | 3/2005 | Anderson et al. | 343/702 |
| 2005/0232459 A1 * | 10/2005 | Rowe et al. | 382/100 |
| 2005/0274890 A1 * | 12/2005 | Anderton et al. | 250/334 |
| 2007/0001895 A1 * | 1/2007 | Kolinko et al. | 342/22 |
| 2007/0034776 A1 | 2/2007 | Weber et al. | |
| 2007/0286460 A1 * | 12/2007 | Tu et al. | 382/103 |
| 2009/0073023 A1 * | 3/2009 | Ammar | 342/22 |
| 2009/0140907 A1 * | 6/2009 | Keller et al. | 342/22 |
| 2009/0212988 A1 * | 8/2009 | Jung et al. | 342/22 |
| 2010/0141502 A1 * | 6/2010 | Cardiasmenos et al. | 342/22 |
| 2010/0182434 A1 | 7/2010 | Koch et al. | |
| 2010/0214150 A1 * | 8/2010 | Lovberg et al. | 342/22 |
| 2010/0231452 A1 * | 9/2010 | Babakhani et al. | 342/368 |

FOREIGN PATENT DOCUMENTS

| | | |
|---|---|---|
| CN | 101793975 A | 8/2010 |
| WO | 01/16617 | 7/2000 |
| WO | 2008003351 | 1/2008 |

OTHER PUBLICATIONS

Ke Su, "Two-dimensional interferometer and synthetic aperture imaging with a hybrid terahertz/ millimeter wave system", 2010 Optical Society of America, Jul. 1, 2010 / vol. 49, No. 19.
Helmut Essen et al., "Concealed Weapon Detection with Active and Passive Millimeter wave Sensors, Two Approaches".
J.Abril et al., "Combined Passive and Active Millimeter-Wave Imaging System for Concealed Objects Detection".

* cited by examiner

*Primary Examiner* — John B Sotomayor
*Assistant Examiner* — Marcus Windrich

(57) ABSTRACT

A hybrid mm-wave imaging system which increases the probability of detection and reduces false alarm rate. The system includes a large array of passive sensors (pixels) to provide an initial coarse picture of the environment and a small array of active sensors in the center of the large array, which is activated only when the initial passive scan detection is positive. The active array, without any mechanical scanning, illuminates the area to detect edges to provide clarity to the detected image, thereby increasing the probability of detection and reducing the false alarm rate.

22 Claims, 5 Drawing Sheets

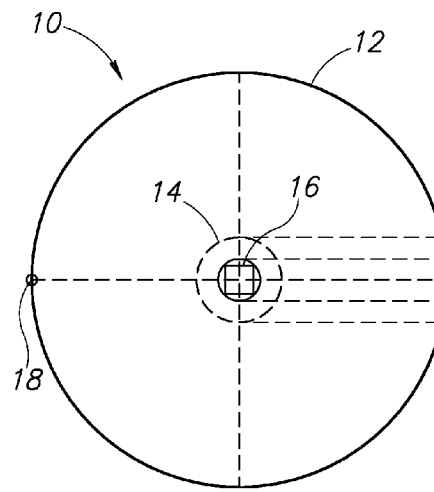
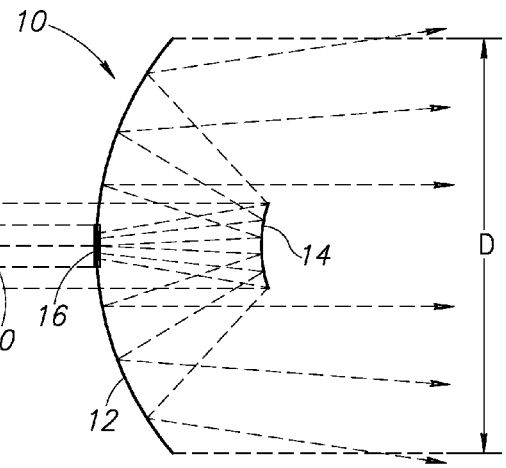
FIG.1A  FIG.1B
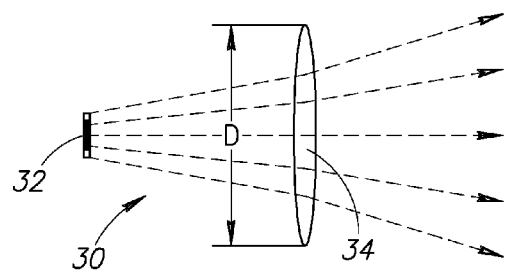
FIG.2

HYBRID MILLIMETER WAVE IMAGING SYSTEM

FIELD OF THE INVENTION

The present invention relates to the field of imaging systems, and more particularly relates to a hybrid millimeter wave imaging system for applications such as detection of concealed weapons and articles.

SUMMARY OF THE INVENTION

There is thus provided in accordance with the invention, an imaging system, comprising a passive mode imager operative to perform a first passive scan, and an active mode imager operative to perform a second active scan subsequent to said first passive scan.

There is also provided in accordance with the invention, an imaging system, comprising a passive mode imager operative to perform an initial passive scan, said passive mode imager comprising an array of passive pixels for providing initial detection capability, and an active mode imager operative to perform a follow-up active scan after said initial passive scan, said active mode imager comprising an array of active pixels and one or more transmitters capable of performing a 3D zoom-in scan of a region of interest of said initial passive scan.

There is further provided in accordance with the invention, an imaging system, comprising a millimeter wave passive mode imager operative to perform an initial passive scan, said passive mode imager comprising an array of passive pixels for providing initial detection capability, and a millimeter wave active mode imager operative to perform an active scan based on the results of said initial passive scan, said active mode imager comprising one or more millimeter wave transmitters and a tiltable active receiving array capable of performing a 3D zoom-in scan of a region of interest of said initial passive scan.

There is also provided in accordance with the invention, a method of imaging, said method comprising providing a millimeter wave passive imager, providing a millimeter wave active imager, and combining said passive imager and said active imager whereby said passive imager operative to perform an initial passive scan, said passive mode imager comprising an array of passive pixels for providing initial detection capability and whereby said active imager operative to perform an active scan based on the results of said initial passive scan, said active mode imager comprising one or more millimeter wave transmitters and a tiltable active receiving array capable of performing a 3D zoom-in scan of a region of interest of said initial passive scan

BRIEF DESCRIPTION OF THE DRAWINGS

The invention is herein described, by way of example only, with reference to the accompanying drawings, wherein:

FIG. 1A is a diagram illustrating a frontal view of an example embodiment of the imaging system of the present invention;

FIG. 1B is a diagram illustrating a side view of an example embodiment of the imaging system of the present invention;

FIG. 2 is a diagram illustrating an alternative embodiment of the imaging system of the present invention;

DETAILED DESCRIPTION OF THE INVENTION

Figure 3:
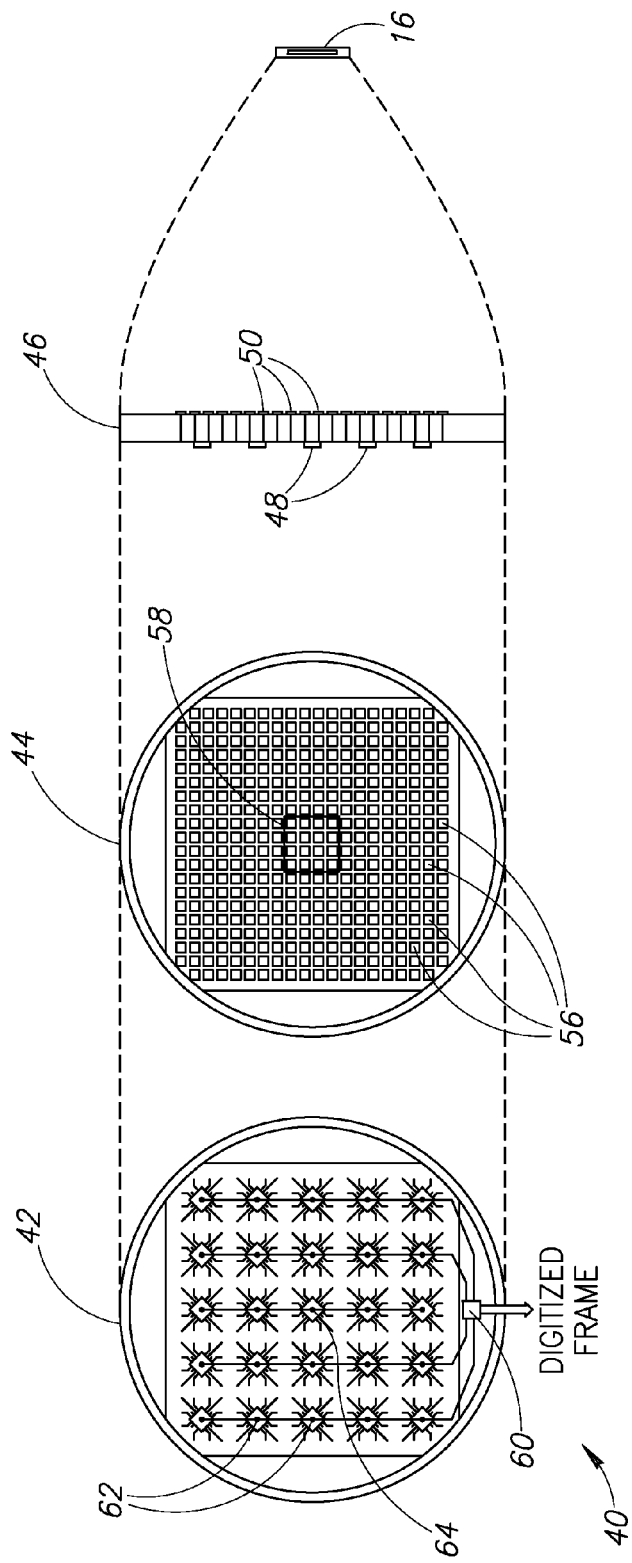
FIG. 3 is a diagram illustrating an example receiver assembly of the imaging system of the present invention.

The present invention provides a hybrid mm-wave imaging system which increases the probability of detection and reduces false alarm rate. The system constructs an initial coarse picture of the environment by means of a large array of power sensors. Upon positive detection, the scene is illuminated with coherent microwave radiation that is detected by both the array of power sensors (pixels) and a small array of vector pixels (which avail both amplitude and phase sensing), located in the center of the large array. The new information, which avails 3D visualization of a selected region, is used to enhance the original picture (facilitating segmentation), thereby increasing the probability of detection and reducing the false alarm rate.

The present invention provides the capability of visualization by detection of millimeter wave (mm-wave) radiation being irradiated or reflected from objects in the imager's field of view. The radiation being irradiated onto the objects is non-ionizing radiation. In addition, the wavelengths of the mm-wave radiation belong to the part of the electromagnetic spectrum that on one hand are long enough to penetrate through fog, clothing and packaging; and on the other, are short enough to allow high resolution imaging even with a relatively small radiating aperture which is beneficial in space constrained applications. These aspects make imaging in this part of the electromagnetic spectrum suitable for use, for example, in security, surveillance and navigation systems.

One embodiment of the invention comprises a hybrid imaging system the enables full-body passive (i.e. radiometric) scanning capable of initial detection which is subsequently augmented by a smaller-area zoom-in scan which is performed using an active (i.e. coherently illuminated) imaging system. The system can be realized in production level silicon for low cost (e.g., SoC integrated circuit based). One embodiment also comprises a mechanism for performing such a hybrid scan to detect concealed articles such as those that pose a security threat.

In one embodiment, passive imaging is combined with active imaging. Passive mode imaging, by itself, in theory enables covert, camera-like imaging. Normally, however, the level of black body radiation is low in the relevant region of electromagnetic spectrum (i.e. 0.1 to 0.3 THz). This results in a poor signal to noise ratio of the images. Moreover, the measured irradiance differences may be too small as modern terrorist threats may emanate from materials with irradiance levels closely resembling those of a human body.

Active mode imaging effectively deals with the black-body radiation issue and also provides additional benefits such as 3D imagery (due to availability of range information). The tradeoff is higher system complexity and image analysis algorithms. The high price of the components typically required for active scanning force the use of mechanically scanned systems with the main drawback of long scan times (incompatible with video frame rates) and increased mechanical complexity. In addition, constant irradiation of the subject being imaged may not be welcome by the general public.

To overcome these disadvantages, the present invention provides a highly integrated low-cost staring-array solution that, in one example embodiment, is based on commonly available production level silicon SoC technology that provides economy of scale pricing. The system has a high probably of detection as it utilizes a passive image sensor augmented with an on-demand zoom-in active 3D imaging. Further, the system can provide images at video frame rates using a physical plurality of sensors.

Thus, in one embodiment, passive and active mode imagers are combined to form a hybrid imaging system. A full scale (staring) focal plane array (FPA) of passive pixels provides the initial detection capability which may then be enhanced (if initial detection is positive) by a smaller active array performing a 3D zoom-in scan of the suspicious region. An advantage of such a system is enhanced probability of detection while reducing system complexity (and therefore cost) as well as providing video frame rate (e.g., 30 fps) ration.

A diagram illustrating a frontal view of an example embodiment of the imaging system of the present invention is shown in FIG. 1A. A diagram illustrating a side view of an example embodiment of the imaging system of the present invention is shown in FIG. 1B. A diagram illustrating an alternative embodiment of the imaging system of the present invention is shown in FIG. 2. With reference to FIGS. 1A and 1B, the imaging system, generally referenced 10, comprises a primary reflector 12 having aperture diameter D, secondary reflector 14, receiver complex or module 16 and a plurality of transmitters 18, 20 (two are shown in this example embodiment). The dielectric lens embodiment, generally referenced 30, shown in FIG. 2 comprises a dielectric lens 34 having aperture diameter D and receiver module 32 located at the focal point of the lens.

In passive imaging mode, the incoming black-body radiation is focused onto a relatively small planar two-dimensional array of receivers 16 (or 32). In the example embodiment shown, the radiation is focused either by means of either dielectric lens 30 or a twin-reflector antenna 10 (also known as a Cassegrain type reflector). The focusing helps achieve the required transversal (azimuthal hereon) resolution which is generally determined by the width of the main lobe of the antenna transmitting/receiving the radar signal. Space diffraction dictates that the angular lobe-width ($\Delta\theta$) is related to $\Delta\theta \propto \lambda/D$ where $\lambda$ is the wavelength of the detected radiation and D is the diameter of the detector aperture. Therefore, employing considerably smaller (mm and even sub-mm) wavelengths allows scaling down the receiving apertures while still obtaining adequate azimuthal resolution.

Note that although two example embodiments are provided for the optical systems, other types of optical systems are suitable as well as is known in the art. Receiver resolution can be enhanced by using larger receiving apertures which provide better gain, i.e. smaller divergence angle resulting in better resolution.

A diagram illustrating an example receiver assembly of the imaging system of the present invention is shown in FIG. 3.

The receiver module (or complex), generally referenced 16, comprises a printed circuit board (PCB) (i.e. substrate) 46 having at least two sides A 44 and B 42. In one embodiment, side A 44 is equidistantly populated with identical printed antennae structures 50 (56) suitable for imaging forming the receiver array. Considering, for example, an operational frequency of 150 GHz, the antenna patches are approximately 1 mm on a side, distanced by about 1 mm (i.e. approximately $\lambda/2$). Considering a 40×40 pixel array, this amounts to 40 mm (with larger or smaller arrays possible as well). In one embodiment, side B 42 is populated with flip-chip mounted/bonded dies 48 (62).

It is noted that the number of pixels depicted does not necessarily correspond to the actual number of pixels realized. An overwhelming majority of antennae 50 are connected to power imaging (Type A) pixels while at the center of the sensor there is a smaller array 58 of vector imaging (Type B) pixels. In one embodiment, Type A pixels comprise direct detection receivers, producing a voltage output proportional to the detected power. The resulting signal has roughly the bandwidth of the low pass filter (LPF) which is $B=(2\tau)^{-1}$ where $\tau$ is the integration time. The signal to noise ratio (SNR) of the detected image is directly proportional to the integration time and therefore by providing a plurality of physical pixels (enabled by a high-level of integration common to silicon based technologies) the integration time can be increased while still obtaining video frame-rates (~30 fps) as the information is gathered simultaneously by all pixels. The integration time permitting real-time video is on a level of tens of milliseconds and hence low frequency A/D conversion can be used to digitize the data for subsequent image reconstruction. Being able to achieve sub-kelvin noise equivalent temperature difference (NETD), however, may not be sufficient for reliable detection of concealed threats (in terms of probability of detection to false alarm ratio). This stems mainly from the fact that potentially harmful objects may comprise materials similar in emissivity/reflectivity to human skin.

Figure 4:
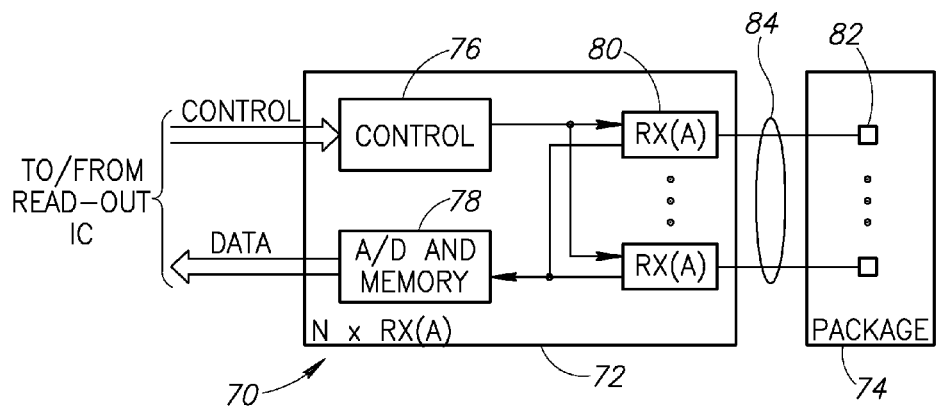
FIG. 4 is a block diagram illustrating example chip, comprising a multiplicity (N) of Type A receivers of the imaging system of the present invention, alongside the control, digitization and memory functionalities.

The majority of dies 62 comprise NxRX(A) integrated circuit (IC) chips as shown in FIG. 4. The circuit, generally referenced 70, comprises NxRX(A) chip 72 and an antenna package 74. The NxRX(A) chip comprises N independent Type-A receivers 80, control logic circuitry 76 responsive to a control signal, an A/D converter used for data digitization and a memory register (fill buffer) used to store the digital data (block 78 operative to generate a data signal). The digital data represents the intensity value as received by one of the pixels. The NxRX(A) receiver 80 is coupled to a respective antenna package 74 comprising a plurality of antennas 82 through vias 84 (incorporated into side A of the receiver assembly 16). Note that in an example embodiment of a 40×40 array, N may equal 64, for example. In addition, the Type A receiver circuitry may be implemented, for example, using well known Si/SiGe IC technology.

Figure 5:
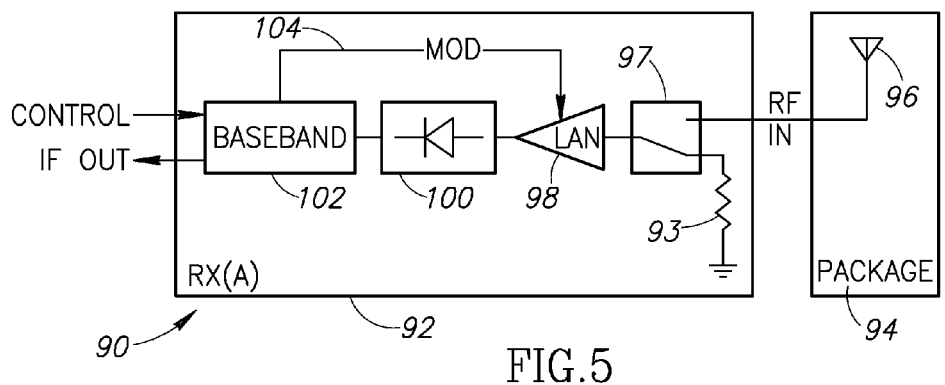
FIG. 5 is a block diagram illustrating in more detail the Type A receiver structure of the imaging system of the present invention.

A block diagram illustrating in more detail the Type A receiver structure of the imaging system of the present invention is shown in FIG. 5. The circuit, generally referenced 90, comprises an RX(A) receiver 92 coupled to an on-package 94 antenna 96. The direct detection receiver RX(A) 92 comprises a well-known Dicke-switch (DS) 97 with one input coupled to impedance (e.g., resistor) 93, low noise amplifier (LNA) 98, power detector circuitry (non-linear element) 100 and a base-band (BB) circuitry realizing a lock-in amplifier 102. In one embodiment, the lock-in amplifier comprises a standard high-sensitivity readout aimed primarily at avoiding the detection of a DC voltage signal (proportional to the target's temperature) due to the high 1/f noise content at those frequencies. By modulating (MOD 104) the incoming RF power with a low frequency wave (using the DS), a replica of the DC voltage is created at an offset frequency where the noise content is much lower.

In one embodiment, passive imaging is combined with active imaging in a hybrid imaging system. Augmentation of the passive imaging capability is achieved by illuminating the target with broadband mm-wave radiation (e.g., a noise source). It is noted that implementing this scheme does not require different receiver elements and can be readily implemented with the available receiver array, provided a suitable source of non-coherent microwave radiation is available.

In the event the passive imaging scan generates a suspected positive detection, an active imaging system is then used. In one embodiment, the active imaging system is based on well known Frequency Modulated Continuous-Wave (FMCW) radar range-gauging techniques. In the example embodiment shown in FIG. 1A two identical transmitters 18, 20 are placed at a largest available azimuthal separation. Transmission alternates from one transmitter to the other (i.e. performing two scans instead of one and thereby increasing the total scan time).

Note that if focusing optics (either a lens or a reflector) are used, each pixel on the receiver array 'sees' a relatively small area of the target. Therefore, on one hand, azimuthal reconstruction (in an active system) is not needed, but on the other hand the distances between the transmitters and receiver (which is increased when more transmitters are added) does not translate into better azimuthal resolution since no reconstruction is performed. Having a plurality of transmitters distanced apart, however, helps reduce specular reflections. In one embodiment, well known imaging processing techniques can be used where several pictures of approximately the same object are taken from slightly different angles to obtain better resolution (since information is added).

Figure 6:
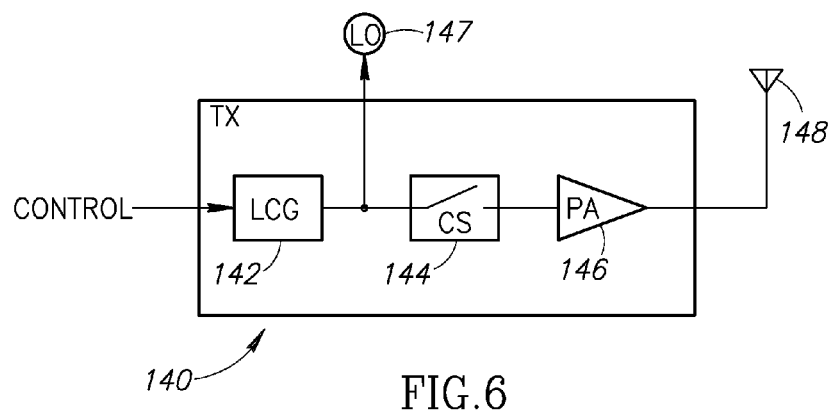
FIG. 6 is a block diagram illustrating a first example transmitter of the imaging system of the present invention.

A block diagram illustrating a first example transmitter of the imaging system of the present invention is shown in FIG. 6. The transmitter, generally referenced 140, comprises a linear chirp generator (LCG) 142, calibration switch 144 and power amplifier (PA) 146 coupled to antenna 148. In one embodiment, the transmitter comprises an all silicon base-frequency transmitter incorporating a linear chirp generator (LCG) 142 that produces the linear frequency sweep required for range-gauging. The calibration switch 144 is operative to allow calibration of the phase/amplitude transfer function of the transmission path. Local oscillator signal 147 is fed-out to the receiver block to avail coherent detection as required by the FMCW technique. Note that higher frequencies (having shorter wavelengths) allow for better resolution.

Figure 7:
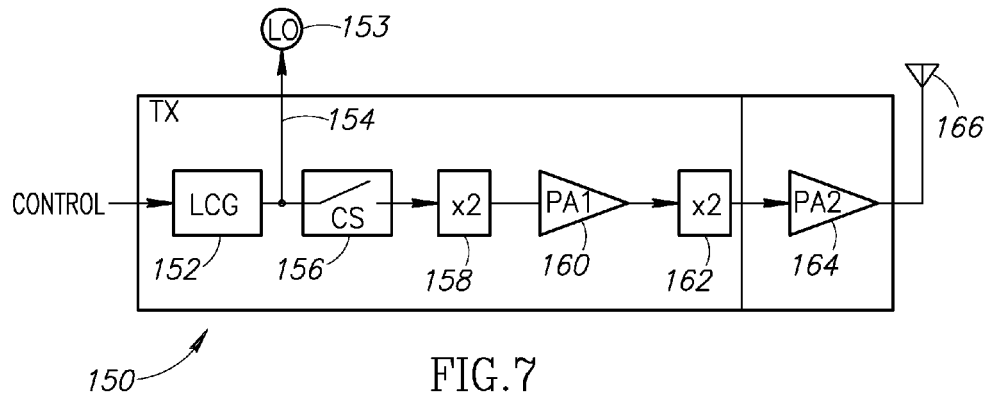
FIG. 7 is a block diagram illustrating a second example transmitter of the imaging system of the present invention.

A block diagram illustrating a second example transmitter of the imaging system of the present invention is shown in FIG. 7. The transmitter, generally referenced 150, comprises a linear chirp generator (LCG) 152, local oscillator signal 153, calibration switch 156, frequency doubler 158, first power amplifier 160, frequency doubler 162 and second power amplifier (PA) 164 coupled to antenna 166.

The transmitter 150 comprises a fractional frequency transmitter incorporating a compound (III-V) semiconductor based power amplifier. This transmitter is suitable for applications that demand higher operational frequencies than those achievable using by pure Si technology (due to insufficiently high gain cut-off frequencies). In one embodiment, the transmitters comprise compound (III-V) semiconductor based final amplification stages, as shown in FIG. 7. For both types of transmitters (140 and 150), operating the amplification chain without the LCG input (open CS) provides the noise source required for noise illumination.

Figure 8:
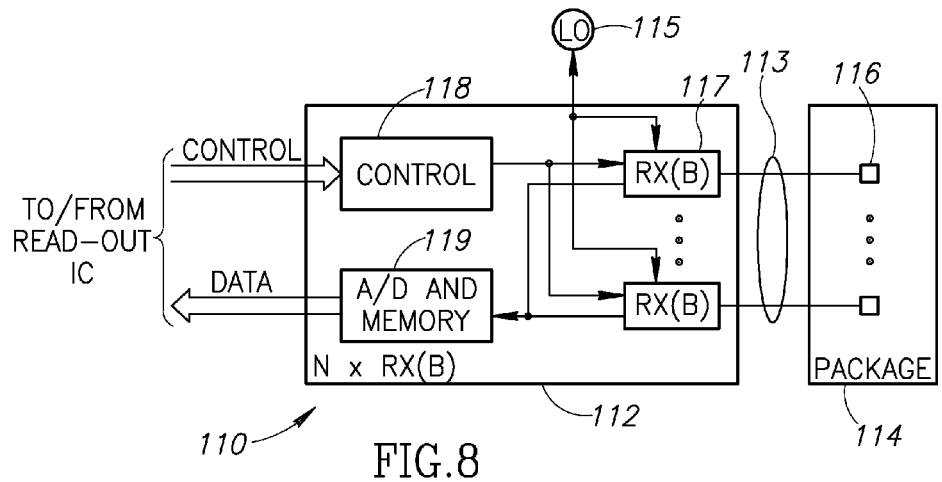
FIG. 8 is a block diagram illustrating example chip, comprising a multiplicity (N) of Type B receivers of the imaging system of the present invention, alongside the control, digitization and memory functionalities.

A block diagram illustrating example Type B receiver of the imaging system of the present invention is shown in FIG. 8. The die 64 (FIG. 3) located at the center of Side B 42 (area 58 of Side A 44) comprises the NxRX(B) chip which is similar to the NxRX(A) chip (FIG. 4). The circuit, generally referenced 110, comprises NxRX(B) chip 112 and an antenna package 114. The NxRX(B) chip comprises N independent Type-B receivers 117, control logic circuitry 118 responsive to a control signal, an A/D converter used for data digitization and a memory register (fill buffer (MEMORY) intended for intermediate results storage) used to store the digital data (block 119 operative to generate a data signal). The signal from local oscillator 115 is fed into each of the individual receivers to allow coherent detection as described above. The digital data represents a stream of reflection intensities with distance being encoded in time. The NxRX(B) receivers 117 are coupled to a respective antenna package 114 comprising a plurality of antennas 116 through vias 113. The Type B receiver circuitry may be implemented, for example, using well known Si/SiGe IC technology.

The data and its volume differs from that of NxRX(A) in that each of the Type B pixels generates a time series of complex valued numbers which are post processed to estimate the range to the point of reflection. Depending on the actual volumes of data to be digitized, in one embodiment, a single A/D converter is employed (serving all N pixels) or in another embodiment, each pixel uses its own A/D.

Figure 9:
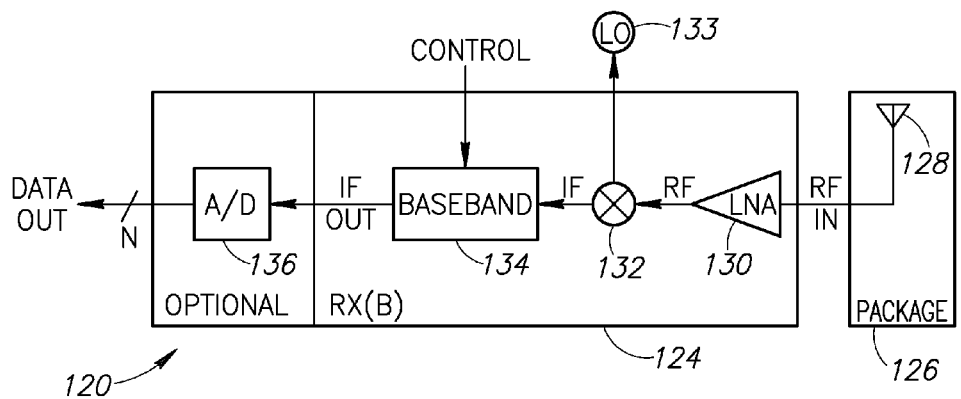
FIG. 9 is a block diagram illustrating in more detail the Type B receiver structure of the imaging system of the present invention.

A block diagram illustrating in more detail the Type B receiver structure of the imaging system of the present invention is shown in FIG. 9. It is noted that the structure of the Type B receivers is more complex than that of Type A receivers, enabling it function in both vector sensor (i.e. Frequency Modulated Continuous-Wave (FMCW) radar) and power sensor (i.e. black-body radiation meter) roles.

In one embodiment, the receiver of the active system uses the same reflector used for passive imaging. A single pixel receives a signal from antenna 128 in package 126. The RF input is amplified by a Low Noise Amplifier (LNA) 130 whose output is input to a mixer 132 where it is mixed with the local oscillator signal 133. The IF signal output of the mixer is then input to base-band circuit (BB) 134 which provides pre-digitization signal processing functionalities such as equalization, automatic gain control, anti-aliasing, etc. The output of the BB is a relatively low frequency IF signal whose frequency is directly proportional to the distance traveled by the scattered wave. In order to avoid range ambiguity, digitization is performed with significant oversampling using one A/D 136 per pixel, which may be realized within a pixel or on the processing board.

Note that due to relatively high complexity of the single receiver pixel element, the hybrid imaging system comprises a small instantaneous field of view to allow augmentation of a certain area of object being imaged that is suspected to contain a boundary of the threat. The overall field of view of the active imaging portion may be enhanced by translational/rotational movement of the receiver module, thereby allowing quick scan times. For example a tilt mechanism may be used to move/rotate the receiver module, using either well-known mechanical or electrical (e.g., piezo-electric) techniques.

Depending on the packaging technology chosen for implementation of the Read-Out-Interface-Controller, it may or may not be located on the same substrate as the NxRX(A/B) chips. The ROI control circuit is operative to perform several control and processing functions, including: (1) controlling the flow of data out of the pixels; (2) controlling the tilt motor/piezo-electric actuator; (3) controlling the frequency sweep of the active imaging mode transmitters; (4) combining the pixels into an ordered frame in passive imaging mode; and (5) implementing a near-field FMCW algorithm for range estimation in the active imaging mode of operation.

In one embodiment, the controller uses Field-Programmable-Gate-Array (FPGA) technology. In systems requiring large active sections (i.e. a large number of pixels) and large ranges of operation with good range resolution, however, ASIC implementation may be preferred due to high computational load. The dependence of computational effort on the pixel multitude and range resolution is described in more detail infra.

Figure 10:
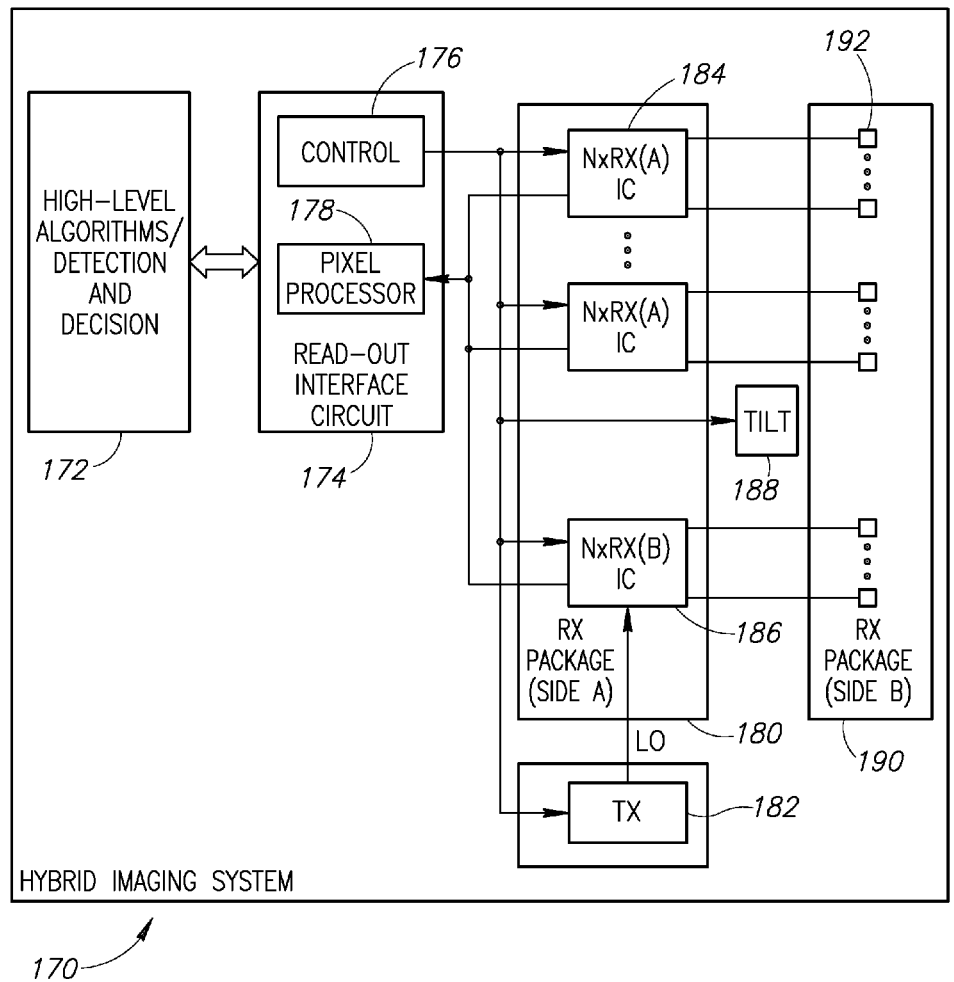
FIG. 10 is a block diagram illustrating an example system structure of the imaging system of the present invention.

A block diagram illustrating an example system structure of the hybrid imaging system and data flow of the present invention is shown in FIG. 10. The hybrid imaging system, generally referenced 170, comprises receive package (Side B) 190 comprising antennas 192 coupled to a receive package (Side A) 180. The receive package 180 comprises a plurality of NxRX(A) chips 184 and one or more NxRX(B) chips. Note that in one embodiment, both NxRX(A) and NxRX(B) chips are employed in both the active and the passive stages with the role of each changing. The target is illuminated in active imaging mode via TX circuit 182. Control information is generated by control block 176 in read-out interface (ROI) circuit 174. ROI circuit 174 also comprises pixel processor 178 for receiving the pixel information from the RX package 180. Control and data information is exchanged with a high level algorithm/detection and decision block 172.

In the passive imaging mode of operation, both Type-A and Type-B receivers, i.e. RX(A) and RX(B), detect the black-body radiation emanating from different areas of the imaged target which is concentrated by the large optical aperture of either a lens or a reflector onto the receiver antenna array (located on Side-B of the RX package 190). It is noted that different areas of the target are concentrated by the lens onto different receiver elements hence azimuth processing is performed by the focusing optics itself.

The voltage proportional to the power detected by each individual RX(A) is first digitized and stored in the fill-buffer so that the pixel may begin a new integration cycle while the data is waiting to be read by the ROI circuit. During this stage, RX(B) pixels mimic the behavior of RX(A) pixels, generating a single voltage output proportional to the detected power. Level correction may be needed at the frame formation stage due to different effective responsivity. The ROI circuit times the data output from the fill-buffers of different N-RX(A)/N-RX(B) chips and stores the image internally for subsequent transmission to a PC or other processor (for example) for high-level image processing and enhancement followed by a detection and decision step.

Upon completion of the above flow, and based on the output of the detection and decision step, the system may identify a potentially threatening region in the imaged scene (i.e. the "flagged area") that requires additional interrogation. At this time, the ROI control circuit issues a control command to steer the receiver complex (not the whole optics) such that the center of the complex feeding the RX(B) receivers best coincides with the "flagged area". The steering may be achieved using any suitable means such as mechanical tilt or a piezo-electric actuation, depending on the size of the receiver complex and the required system agility.

The target is then illuminated with coherent RF radiation emitted from the transmitter (TX). A reflected signal is then received at both the RX(B) and the RX(A) receivers. Within the RX(B) receivers, the detected signal is mixed with the currently transmitted frequency (which changes linearly at a constant rate in accordance with the well-known FMCW technique) to generate a low frequency IF signal which is then sampled and digitized, resulting in a time-series of complex values. The complex data is then passed to the ROI circuit in which a Fourier transform is applied to each time-series resulting in a "frequency" domain picture essentially comprising a range map wherein each "frequency" corresponds to a range between the imager and the reflection point on the target. This range map can then be passed to the PC (or other processor) for post-detection processing and an additional detection and decision step, a positive result of the latter will cause the object to be flagged for closer inquiry by security personnel.

It is noted that employing more than one transmitter, distanced at considerable range, may help overcome specular (i.e. non-Lambertian) reflections from the imaged object. Since azimuthal processing is performed using a fixed lens (essentially, each point on a target is only seen by one pixel of the receiving array), however, use of a plurality of transmitters and therefore even larger plurality of distances between the transmitter and receiver cannot be used for azimuthal resolution enhancement.

The reflected signal received within the RX(A) receivers is being detected in the same manner the black-body radiation is detected during the passive scan. Since the reflected power can be made arbitrarily strong, it overrides the black-body radiation and creates a voltage at the detector output proportional to the reflectivity of the surroundings of the area of interest imaged by RX(B) receivers. This effectively creates a reflections map of these surroundings (i.e. a new 2D image, akin to that acquired from passive scan), which despite not necessarily overlapping the region imaged during the passive scan, may still provide additional information.

Moreover, since the imaged target may have shifted (slightly) in between those scans (which may be executed with a millisecond scale delay) regions formerly concealed or abstracted may now become clearly visible. Modern image processing and artificial vision techniques may then be used to combine the images resulting from both passive (radiometric—availing camera-like 2D image on the environment) and active (illuminated) scans (producing a 3D image of the flagged area and a new 2D image of its surroundings). The combination of the above facilitates edge detection and segmentation (i.e. recognition of different objects present in the same image) leading to improved detection capabilities.

It is further noted that the hybrid imaging system described does not require mechanical scanning. Pixel plurality is provided by the low cost integrated circuits which take advantage of mass-produced Si based processes. The lack of mechanical scanning allows for considerably faster image acquisition and therefore a considerably larger amount of information is collected before a decision is reached.

The initial image acquisition is performed using passive imaging and only if this step results in positive detection, is the active imaging mode activated to illuminate only the problematic area providing additional information that when combined with the previously acquired data increases the probability of detection and reduces the false alarm rate. During active imaging mode, both amplitude and phase (which is equivalent to distance) information is acquired. RF stage pre-amplification is performed in the receiver and the LO signal injected from the transmitter is used instead of requiring a different local oscillator.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. An imaging system, comprising:
  sensors of a first type and sensors of a second type on a single plane;
  a first array of printed antennas located on a first side of a printed circuit board (PCB) and electrically coupled to first receive circuits located on a second side of said PCB through vias, the first receive circuits connected to the sensors of the first type;
  a second array of printed antennas located on said first side of said PCB and electrically coupled to second receive circuits located on said second side of said PCB through vias, the second receive circuits connected to the sensors of the second type;
  at least one transmitter; and
  a detection and decision block,
  wherein the imaging system is adapted to acquire a first image in a passive scan in radiometric mode, and in response to positive detection results, to illuminate an imaged object with coherent radiation, and acquire a second image in an active scan performed in reflectometric mode,
  wherein the sensors of the first type and the sensors of the second type are active in acquiring the first image, and the at least one transmitter, the sensors of the first type and the sensors of the second type are active in acquiring the second image, and
  wherein the detection and decision block is adapted for control and data information exchange.

2. The system according to claim 1, wherein said passive scan and said active scan are millimeter wave scans.

3. The system according to claim 1, wherein said active scan is centered on a region identified by said passive scan.

4. The system according to claim 1, wherein said sensors of second type provide three dimensional information in the active scan, wherein the three dimensional information relates to a suspicious region within the region covered by the active scan.

5. The system according to claim 1, wherein information from the second image is used in combination with information from the first image to enhance overall resulting output picture and detect any new suspicious regions.

6. An imaging system, comprising:
  an imager operative to perform a passive scan and an active scan, said imager comprising:
  sensors of a first type and sensors of a second type located on a single plane;
    a first array of printed antennas located on a first side of a printed circuit board (PCB) and electrically coupled to first receive circuits located on a second side of said PCB through vias, the first receive circuits connected to the sensors of the first type;
    a second array of printed antennas located on the first side of a printed circuit board (PCB) and electrically coupled to second receive circuits located on a second side of said PCB through vias, the second receive circuits connected to the sensors of the second type;
  at least one transmitter; and
  a detection and decision block,
  wherein the imager is operative to perform a follow-up active scan centered on an area of interest after a passive scan, responsive to a positive detection by said passive scan, wherein said active scan provides an image which combines reflectometric information from the entire imaged object and a 3D zoom-in information of a region of interest of said passive scan,
  wherein the sensors of the first type and the sensors of the second type are active during the passive scan, and the at least one transmitter, the sensors of the first type and the sensors of the second type are active during the active scan, and
  wherein the detection and decision block adapted for control and data information exchange.

7. The system according to claim 6, wherein both said passive scan and said active scan are performed millimeter wave scans.

8. The system according to claim 6, wherein said passive scan utilizes a focusing element to focus radiation onto sensors of the first type and sensors of the second type.

9. The system according to claim 6, wherein said passive scan focuses black body radiation onto sensors of the first type comprising direct detection receivers and onto sensors of the second type comprising heterodyne detection receivers.

10. The system according to claim 6, wherein said imager illuminate a target with millimeter wave radiation in the active mode only.

11. The system according to claim 6, wherein said active scan is generated by at least two transmitters separated by a distance.

12. The system according to claim 6, wherein the active scan performed by the sensors of the second type is directional and is adjustable to focus on a desired region of interest of said passive scan.

13. The system according to claim 6, wherein performing the active scan comprises illuminating a target area with coherent RF radiation and generating an output voltage proportional to the power of a signal reflected from the target in sensors of the first type and generating a low IF signal from a signal reflected off said target in sensors of the second type.

14. The system according to claim 13, wherein said low IF signal is further processed to detect one or more suspicious objects at said target.

15. The system according to claim 6, wherein information acquired by the active scan is used in combination with one or more images previously acquired through passive scan, and currently acquired 3D images to enhance a resulting output picture and detect any new suspicious regions.

16. An imaging system, comprising:
a millimeter wave imager comprising:
a tiltable array comprising sensors of a first type and sensors of a second type located on a single plane;
at least one transmitter; and
a detection and decision block adapted for control and data information exchange,
the imager operative to:
perform a passive scan;
in response to positive detection results of the passive scan;
perform an active scan comprising: illuminating a target with coherent RF radiation;
performing a 3D zoom-in imaging of a region of interest of said passive scan by the sensors of the second type receive a reflected signal;
utilizing FMCW techniques and Fourier analysis to generate a frequency domain based range map image of said region of interest;
performing imaging of areas external to the region of interest in reflectometric mode by the sensors of the first type; and
producing output voltage signal directly proportional to the signal power reflected of the imaged object,
wherein the sensors of the first type and the sensors of the second type are active during the passive scan, and the at least one transmitter, the sensors of the first type and the sensors of the second type are active during the active scan.

17. The system according to claim 16, wherein information acquired by the active scan is used in combination with one or more previously acquired radiometric images acquired through passive scan and currently acquired 3D imagery to enhance a resulting output picture and detect any new suspicious regions.

18. A method of imaging, said method comprising:
providing a millimeter wave imager comprising a tiltable array comprising sensors of a first type capable of scanning a region in a radiometric mode and in a reflectometric mode and sensors of a second type capable of scanning a region in a radiometric mode and in a reflectometric mode, the sensors of the first type and the sensors of the second type located on a single plane;
whereby the imager is operative to:
perform a passive scan in radiometric mode with both types of sensors; and
in response to positive detection results of the passive scan,
perform an active scan with the sensors of the second type aimed at the area of interest of the passive scan and the sensors of the first type generating a reflectometric image of the rest of the imaged object,
wherein said imager includes a first array of printed antennas located on a first side of a printed circuit board (PCB) and electrically coupled to first receive circuits located on a second side of said PCB through vias and a second array of printed antennas located on said first side of said PCB and electrically coupled to second receive circuits located on said second side of said PCB through vias.

19. The method according to claim 18, wherein said passive scan utilizes a focusing element to focus black body radiation onto sensors of the first type and sensors of the second type.

20. The method according to claim 18, wherein information acquired by the active scan is used in combination with one or more previously acquired radiometric images and currently acquired 3D imagery to enhance a resulting output picture and detect any new suspicious regions.

21. An imaging system, comprising:
sensors of a first type and sensors of a second type on a single plane wherein the sensors of the second type are located substantially around a central area of the single plane;
at least one transmitter; and
a detection and decision block adapted for control and data information exchange,
wherein the imaging system is adapted to:
acquire a first image in a passive scan by sensors of the first type and sensors of the second type, the sensors of the first type and sensors of the second type operating in radiometric mode, and
in response to positive detection results, to:
illuminate an imaged object with coherent radiation by the at least one transmitter, and
acquire a second image in an active scan by sensors of the first type and sensors of the second type, the sensors of the first type and the sensors of the second type operating in reflectometric mode, and
combine the first image and the second image by a processor.

22. The system according to claim 21, wherein the sensors of a first type outnumber the sensors of the second type.

* * * * *